United States Patent
Subramanian et al.

(10) Patent No.: US 12,039,203 B1
(45) Date of Patent: Jul. 16, 2024

(54) DATA STORAGE SYSTEM EMPLOYING DELAYED RESPONSES TO INFLUENCE RATE OF BULK STORAGE OPERATIONS

(71) Applicant: Dell Products L.P., Round Rock, TX (US)

(72) Inventors: Vasudevan Subramanian, Chapel Hill, NC (US); Vamsi K. Vankamamidi, Hopkinton, MA (US); Maher Kachmar, Marlborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/120,707

(22) Filed: Mar. 13, 2023

(51) Int. Cl.
    G06F 3/06 (2006.01)
(52) U.S. Cl.
    CPC .......... *G06F 3/0659* (2013.01); *G06F 3/0611* (2013.01); *G06F 3/067* (2013.01)
(58) Field of Classification Search
    CPC ....... G06F 3/0659; G06F 3/0611; G06F 3/067
    See application file for complete search history.

(56) References Cited

U.S. PATENT DOCUMENTS

| | | | |
|---|---|---|---|
| 8,972,627 B2 | 3/2015 | Strasser et al. | |
| 11,610,642 B2 | 3/2023 | Helmick et al. | |
| 2015/0161009 A1* | 6/2015 | Nakagawa | G06F 11/1469 714/6.23 |
| 2019/0258424 A1* | 8/2019 | Rinaldi | G06F 3/0659 |
| 2020/0294562 A1* | 9/2020 | Hasbun | G06F 12/0859 |
| 2023/0342292 A1* | 10/2023 | Govindarajan | G06F 11/3037 |

* cited by examiner

*Primary Examiner* — Tasnima Matin
(74) *Attorney, Agent, or Firm* — BainwoodHuang

(57) ABSTRACT

A data storage system continually monitors a loading level of processing requests from host computers relative to a predetermined threshold. In response to the loading level not exceeding the predetermined threshold, a first bulk operation request is responded to with a normal acknowledgment issued without a rate-managing delay. In response to the loading level exceeding the predetermined threshold, a third bulk operation request is responded to with a delayed acknowledgment issued with the rate-managing delay and thus delaying issuance by a requesting host of a subsequent fourth bulk operation request to a delayed time after the third bulk operation request. The use of the delayed acknowledgement throttles the rate of bulk operations and thus limits adverse performance impact to other, latency-sensitive operations such as regular read and write operations.

16 Claims, 3 Drawing Sheets

DATA STORAGE SYSTEM EMPLOYING DELAYED RESPONSES TO INFLUENCE RATE OF BULK STORAGE OPERATIONS

BACKGROUND

The invention is related to the field of data storage system.

SUMMARY

A data storage system operates according to a method to influence a rate of executing bulk operations for one or more separate host computers, where each bulk operation includes a respective bulk operation request from a host computer to the data storage system identifying a respective area of storage to be deallocated and made available for a new allocation. Generally each host computer issues new bulk operation requests only as preceding bulk operation requests are completed as indicated by corresponding acknowledgements from the data storage system. A loading level of processing requests from the host computers relative to a predetermined threshold is continually monitored. In response to the loading level not exceeding the predetermined threshold, a first bulk operation request is responded to with a normal acknowledgment, which is issued without a rate-managing delay and thus enables a requesting host to issue a subsequent second bulk operation request at a nominal time after the first bulk operation request. In response to the loading level exceeding the predetermined threshold, a third bulk operation request is responded to with a delayed acknowledgment, which is issued with the rate-managing delay and thus delays issuance by a requesting host of a subsequent fourth bulk operation request to a delayed time after the third bulk operation request. The use of the delayed acknowledgement essentially slows down or "throttles" the bulk operations, to limit an adverse performance impact to other, latency-sensitive operations such as regular read and write operations from the hosts.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
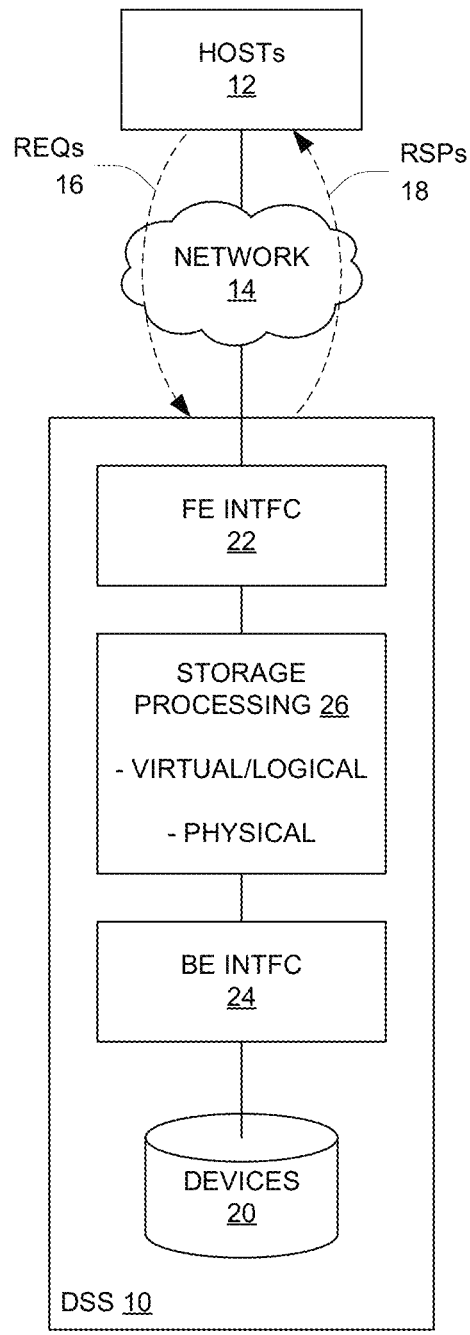
FIG. 1 is a block diagram of a data storage system.

In a large data center, there may be a large number of host computers (hosts) that connect to a single data storage system for storage access. These hosts could be running a variety of operating systems such as ESXi, Linux, Windows, AIX, Solaris, and other similar OSs. Some of the operating systems, such as Windows, Linux and ESXi, support clustering of hosts as well. Applications running on these diverse hosts and clusters of hosts are usually totally independent of each other and each of these applications expect performance per their own predefined service level agreements (SLAs). Apart from regular storage requests such as read and write requests, some or all hosts may also issue other requests for what are referred to herein as "bulk storage operations", which can have a disproportionate need for storage appliance resources and adversely impact performance of regular, latency-sensitive requests such as atomic-test-and-set (ATS), data reads, and data writes.

In this description the impact of SCSI UNMAP requests/ operations is discussed as a prime example of bulk operations that can impact the performance of data storage system. UNMAP in most cases is not a critical request that needs to be completed in a timely fashion. Usually, it is not issued on behalf of applications but instead to free up storage in the file system in which the application is running, because the application freed up storage by deleting a file or deleting a redundant database table. UNMAP is an example of a bulk operation request from host which, apart from being less critical, also places a very high processing cost on storage. If UNMAP requests could be throttled for some scenarios, it could benefit applications that require storage to be very responsive for their latency-sensitive operations.

In some scenarios such as when the data storage system is approaching out of space scenario, UNMAPs can become more critical, thus in this scenario UNMAPs would not be throttled. Logic in the data storage system can detect this scenario and operate appropriately. A second scenario is when the data storage system is used in a storage-as-service or pay-as-use model in which customers are charged for the storage used. In these uses, it may be necessary to exempt some/all volumes of such customers from UNMAP throttling.

Although the present description focuses on the specific example of SCSI UNMAP throttling, the techniques are generally applicable to similar operations in other environments, such as the NVMe UNMAP equivalent for example.

In some environments such as an ESXi cluster, the rate of UNMAP requests can be very high. As an example, there are virtual-desktop scenarios in which hundreds or thousands of virtual machines (VMs) could be powered down at about the same time, such as at the end of a work shift. When VMs are shutdown, a swap VMDK file associated with each VM is deleted. This causes eventual reclaiming of the underlying physical storage associated with all the swap VMDK files that are deleted, including issuance of a large number of SCSI UNMAP requests to the storage system. Each ESXi host in a cluster is responsible for freeing storage after VMs are shut down and swap VMDK files are deleted. While the hosts are sending UNMAPs, the data storage system is concurrently processing regular reads and write requests from other hosts of the cluster, as well as potentially from hosts in other ESXi clusters connected to the data storage system.

In a system having a large cluster of host computers (e.g., up to 128), it can be shown that the rate of UNMAP requests that could be as high as ~130 GB/sec. Such a high rate is generally no sustainable by an individual data storage system, and in fact an UNMAP rate higher than about 10-30 GB/sec would be hard to sustain without adversely impacting other hosts using the data storage system. Moreover, such a high UNMAP rate will impact other requests from the same ESXi cluster and from other ESXi clusters and other hosts OSs and clusters.

In some systems, management software can help mitigate the above issue by allowing users to control the UNMAP rates, such as by letting administrators decide how many ESXi hosts in a ESXi cluster can send concurrent UNMAP requests. This can help but it may not mitigate the issue completely. For example, ESXi will be unaware that the datastores are on one data storage system or on multiple data storage systems (which can support a higher UNMAP rate as compared to a single data storage system). Second, different models of data storage systems can support different UNMAP rates, but ESXi is not aware of such varying capabilities. Third, one ESXi cluster administrator might be unaware of the existence and usage of another ESXI cluster attached to the same storage system or existence and usage from other host OSs. This makes any policy tuning on the ESXi cluster to be a best effort which may or may not have the desired consequences.

To address the above-described issues of managing UNMAP rates, it is proposed that the data storage system have an ability to throttle back UNMAP requests. The storage system has the complete view of not only a specific ESXi cluster but also all other ESXi clusters and other hosts running other operating systems that are connected to the system and sending UNMAP requests. The data storage system is also aware of the influx of critical operations like atomic test-and-set (ATS), read, and write, as compared to other operations like UNMAP for example. Each I/O request from a host is allocated 30 seconds to complete the request before the host tries to abort the request because the storage appliance was unresponsive. When there is a surge of UNMAP requests, these requests tend to complete in less than 2 minutes in the worst case, but the UNMAP requests are competing for resources with other critical requests like ATS, read and write and hence impacting the latency of such critical requests.

The mechanism that is proposed is to artificially delay the response to the host for bulk operation commands such as UNMAP. The artificial delay is kept safely below 30 seconds, the default time after which host sends aborts. Instead, the data path in the data storage system, based on the current rate of various request types, induces delays in responding to the UNMAP request. Usually, hosts try to send a constant stream of UNMAP requests and unless the response for the previous one was received, will not send more. Thus, delaying responses effectively reduces the overall rate of UNMAP requests. Also, because the delays are dynamic based on the current usage of resources on the appliance, applications on hosts can get very quick feedback and adjust their UNMAP rates gradually to change the rate of UNMAP requests. The advantage of this storage-system-based approach as compared to host-based approaches is that it works with a single host cluster or with multiple host clusters, and with other host OSs.

In some cases, the data storage system might be close to getting out of space. In those cases, the algorithm for inducing the delay detects this condition and allows UNMAP to run without any delay so that space can be freed. In this scenario, it is better for the host applications to have longer latencies (due to competing UNMAPs) as compared to running out of space. Out of space scenario is just one such scenario and, in the implementation, there can be other factors that could be accounted for to consider not to induce the delay.

Thus, the disclosed approach can allow a data storage system to work at scale in a diverse data center, by providing cues to the host to back off on certain less critical requests to storage so that the more critical operations from hosts can have improved latency and hence help applications across the board on all independent hosts using the same storage. It helps to build a cooperative ecosystem of hosts and storage for improved application performance.

EMBODIMENTS

FIG. 1 shows a data processing system having a data storage system (DSS) 10 coupled to host computers (Hosts) 12 via a network 14. As shown, the hosts 12 and DSS 10 exchange requests (REQs) 16 and corresponding responses (RSPs) 18 via the network 14. The DSS 10 provides persistent secondary storage using storage devices 20 such as magnetic disks, Flash memory, etc. The DSS 10 further includes front-end interface circuitry (FE INTFC) 22 for interfacing to the hosts 12, back-end interface circuitry (BE INTFC) 24 for interfacing to the devices 20, and storage processing circuitry 26 that executes storage system software to provide data storage functionality both at a virtual or logical level (e.g., logical and virtual storage devices) as well as at a lower physical level (e.g., physical storage of data on the devices 20). Those skilled in the art will appreciate that the presently disclosed technique is provided in large part by operation of storage system software at the virtual/logical level, relying on generally known techniques for communicating with the hosts 12 and for using the devices 20 for underlying physical data storage.

Figure 2:
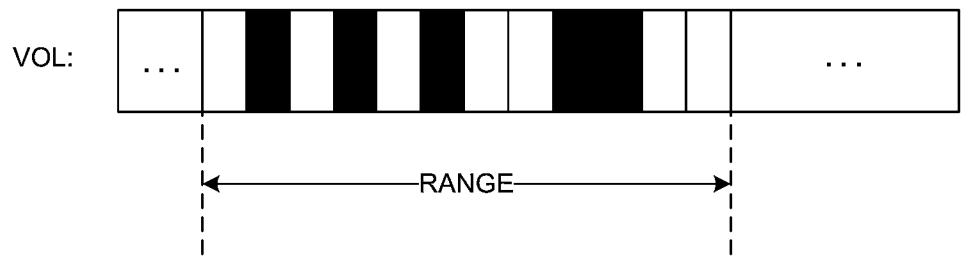
FIG. 2 is a schematic depiction of a volume storage object showing an example pattern of allocated blocks and a range for an UNMAP operation.

FIG. 2 is a schematic illustration of an example storage object identified as a volume (VOL). From the perspective of a host 12, a volume appears as a distinct storage entity having various characteristics including a size, typically specified in bytes (e.g., 100 GB). Such a storage object is available as a linear or sequential space, with operations being performed at specific locations by identifying a range of addresses within the space (e.g., a range of block addresses, as commonly known). Another feature of a volume is the possibility that it may be only sparsely populated, meaning that it consumes underlying physical storage resources only as needed. An example of such sparse utilization is indicated by shading in FIG. 2, where shaded areas indicate in-use or allocated blocks, and unshaded areas indicate unused or unallocated blocks.

As noted above, the presently disclosed technique can have particular applicability in connection with deletion of swap VMDK files when large numbers of VMs are being shut down. A VMDK file exists in a VMFS file system which exists on a LUN or volume of the data storage system 10. When a VMDK file gets deleted or shrunk, VMFS issues UNMAP to the underlying volume and the UNMAP is received on the data storage system 10. The present technique is directed to this scenario where a surge of UNMAP can be experienced. In particular, this scenario exhibits a scale problem with the large number of ESXi hosts in a cluster and large number of datastores.

Thus, the purpose of an UNMAP request is to de-allocate previously allocated storage, so that it can be reassigned for another use. An UNMAP request specifies both the target object (e.g., a volume) and a range within the object which is to be unmapped. FIG. 2 shows an example of such a range. The result of an UNMAP is to effectively remove allocated blocks from the identified range of the volume, leaving the entire range empty (free of allocated areas) and return the underlying physical storage to a pool or other collection where it is available for re-allocation to other objects.

Figure 3:
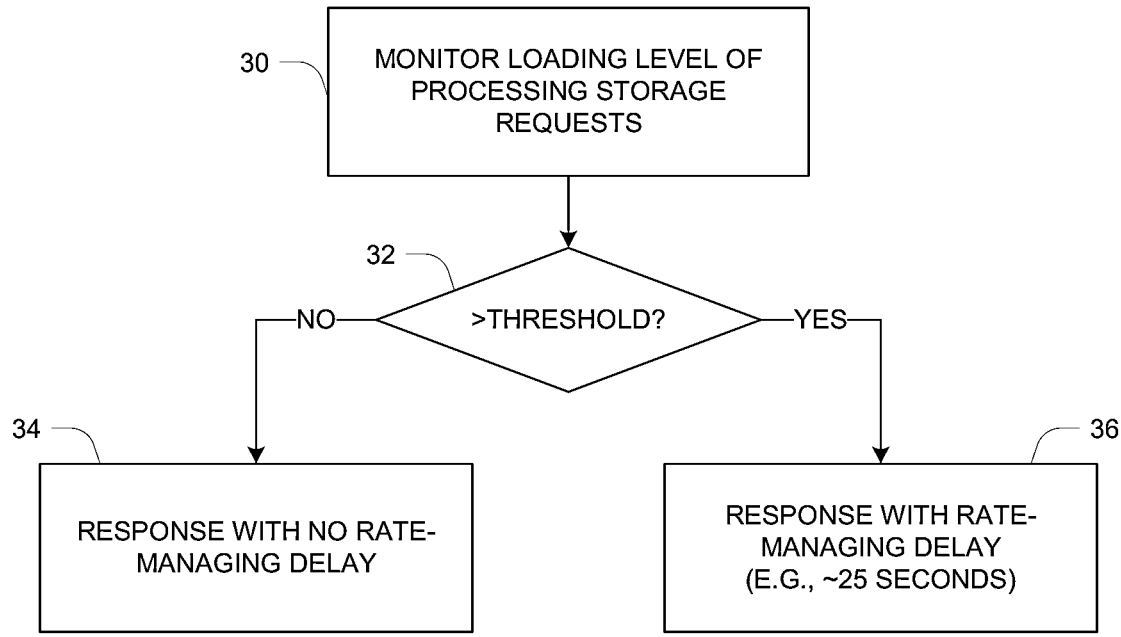
FIG. 3 is a simplified flow diagram of a general technique for returning delayed acknowledgement to a bulk operation request to influence the rate of bulk operations by a requesting host computer.

FIG. 3 is a flow diagram depicting certain operation of the storage processing circuitry 26 in relation to bulk storage operations (e.g., UNMAPs) being performed by the hosts 12. In particular, this operation is one way to enable the DSS 10 to influence a rate of bulk storage operations of the hosts 12, to limit the performance impact of such operations on regular operations (reads and writes) such as described above. The hosts 12 issue new bulk operation requests only as preceding bulk operation requests are completed as indicated by corresponding acknowledgements from the data storage system 10.

At 30, the storage system 10 continually monitors a loading level of the data storage system processing requests from the host computers 12. This monitoring may be accomplished in a variety of ways, including for example by tracking the delay or latency of requested operations and calculating a representative statistic such as an average latency. This is performed for at least latency-sensitive requests such as regular read and write operation, ATS, etc.

At 32, upon receiving a bulk operation request, a test is performed to ascertain the current level of loading relative to a predetermined threshold that is indicative of a corresponding performance impact. Again, taking the example of a latency measure, step 32 could involve comparing the current value of a measured average latency to a predetermined maximum desired latency for regular operations, e.g., 10 mSec for example. If this threshold is not exceeded, then processing proceeds to step 34, and if it is exceeded, then processing proceeds to step 36.

At 34, in response to the loading level not exceeding the predetermined threshold, the bulk operation request is responded to with a normal acknowledgment, the normal acknowledgment being issued without a rate-managing delay and thus enabling issuance of a subsequent additional bulk operation request at a nominal time after the first bulk operation request.

At 36, in response to the loading level exceeding the predetermined threshold, responding to a third bulk operation request with a delayed acknowledgment, the delayed acknowledgment being issued with the rate-managing delay and thus delaying issuance of a subsequent additional bulk operation request to a delayed time after the third bulk operation request. As mentioned above, the rate-managing delay is generally in the range from near zero to near the request timeout. If the request timeout is known to be about 30 seconds, then the rate-managing delay could be as high as approximately 25 seconds for example (i.e., sufficiently less than 30 seconds to robustly avoid triggering the timeout at the host 12).

The general technique of FIG. 3 can be used with various additions and variations, some of which are now described in some detail.

Figure 4:
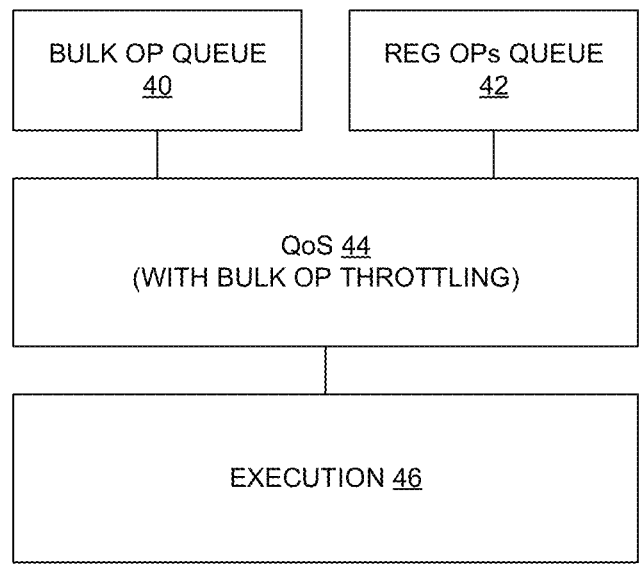
FIG. 4 is a block diagram of certain structure of storage processing circuitry.

FIG. 4 shows certain relevant structure and functionality of the storage processing circuitry 26 in some embodiments. It utilizes separate queues 40, 42 for bulk operations (Bulk Ops) and regular operations (Reg Ops, e.g., application reads and writes) respectively. A Quality of Service (QOS) component 44 manages the selection and timing of queued operations to be performed by an execution component 46. The functionality of the presently disclosed technique is provided primarily by the QoS component 44, as described in detail below. It will be appreciated that operation embodies the generalized technique of FIG. 3, as well as additional features.

Figure 5:
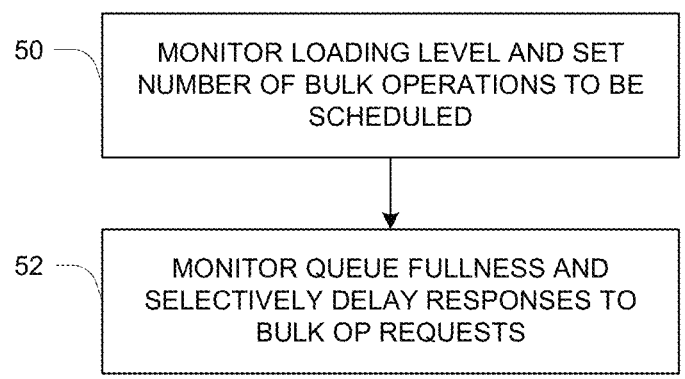
FIG. 5 is a simplified flow diagram of a more specific technique of influencing a rate of bulk operations using two separate mechanisms including the technique of FIG. 3.

FIG. 5 illustrates certain operation of the QoS component 44 of FIG. 5, which reflects a two response strategy for managing the rate of handling bulk operations that include initial identification requests such as bitmap requests. It is assumed that new requests are added to the respective queue 30, 32 as they are received from the hosts 12, i.e., bitmap requests are placed in the bulk operations queue 40, and regular requests (reads, writes, etc.) are placed in the regular operations queue 42.

FIG. 5 illustrates certain operation of the QoS component 44 of FIG. 5, which reflects a two-level response strategy for managing the rate of handling bulk operations. It is assumed that new requests are added to the respective queue 30, 32 as they are received from the hosts 12, i.e., bulk operation requests are placed in the bulk operations queue 40, and regular requests (reads, writes, etc.) are placed in the regular operations queue 42.

At 50, the QoS component 44 continuously measures current load on the data storage system 10 and sets the number of bulk operations to be scheduled for execution at a given time (e.g., a maximum of 5 or 10, for example). This limit number is generally inversely proportional to system loading, i.e., it may be reduced as loading increases and be increased as loading falls. The scheduling may be performed using a leaky-bucket algorithm, for example, in which the number of tokens available for bulk Operations is determined by impact to regular host IOs. Thus, if there is no impact to host IOs, bulk Operations will be completed normally (quickly scheduled), and if there is impact to Host IOs, they will be slowed down (more selectively scheduled). Additionally, at this step, if a received bulk operation request is very large (e.g., 256 MB), it can be broken into multiple smaller requests to achieve parallelism of execution on multiple CPU cores.

At 52, as another mechanism, after completion of an bulk operation, if the bulk operations queue 40 has many pending requests waiting for execution, the response on the completed bulk operation can be delayed up to some maximum value (e.g., 25 seconds). Assuming that a host 12 waits for completion of one bulk operation request before issuing another, this delay can have the effect of slowing down the overall rate of bulk operations being submitted to the storage system 10.

There may be additional factors that modify the operation of FIG. 5. For example, in case queued bulk operations are approaching timeout thresholds while waiting for scheduling in the bulk operations queue 40, their priority may be elevated by the QoS 44 (e.g., more tokens are made available for their scheduling) to avoid disruptive time-outs of pending requests/operations.

Additionally, even though bulk operations such as UNMAPs are treated as background operations and scheduling of them is determined based on minimizing impact on host Ios, in some scenarios some operations such as UNMAP operations could become critical operations needed for proper functioning of the storage system. One such case is when system is approaching "Out of Space" condition, i.e., a critical shortage of physical storage resources that limits the ability to satisfy new allocations. In this case, the priority of UNMAP requests may be elevated so that they are executed even if they have a negative performance effect on regular I/Os, to help the system free up storage resources and avoid or at least delay such an "Out of Space" condition.

Also, in addition to raising the priority on UNMAP requests, priority on other related background processes (e.g., trash-bin processing, reference count decrement processing) may also be elevated to free up capacity. It is also noted that in a log-structured system, the amount of free space is related to the performance of regular host I/Os, so that elevating the priority of UNMAPs to achieve freeing-up of the capacity may itself be positive for performance of Host IOs.

The process of FIG. 5 uses the general technique of FIG. 3 in a particular way, i.e., as the second mechanism 52 performed under particular circumstances and along with the first mechanism 50 as shown. It will be appreciated that this is only one example use, and that the general technique of FIG. 3 may be used in other specific manners as the needs and capabilities of an operating platform (i.e., data storage system) may dictate.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system to influence a rate of executing bulk operations for one or more separate host computers, each bulk operation including a respective bulk operation request from a host computer to the data storage system identifying a respective area of storage to be deallocated and made available for a new allocation, each host computer issuing new bulk operation requests only as preceding bulk operation requests are completed as indicated by corresponding acknowledgements from the data storage system, the method comprising steps, by the data storage system, of:

continually monitoring a loading level of processing requests from the host computers relative to a predetermined threshold;

in response to the loading level not exceeding the predetermined threshold, responding to a first bulk operation request with a normal acknowledgment, the normal acknowledgment being issued without a rate-managing delay and thus enabling a requesting host to issue a subsequent second bulk operation request at a nominal time after the first bulk operation request; and in response to the loading level exceeding the predetermined threshold, responding to a third bulk operation request with a delayed acknowledgment, the delayed acknowledgment being issued with the rate-managing delay and thus delaying issuance by requesting host of a subsequent fourth bulk operation request to a delayed time after the third bulk operation request.

2. The method of claim 1, wherein the monitoring includes (1) tracking latencies of latency-sensitive requests separate from the bulk storage operations and calculating an average latency, and (2) comparing a current value of the average latency to a predetermined maximum desired latency for the latency-sensitive requests.

3. The method of claim 1, wherein the data storage system maintains distinct queues including an bulk-operations queue for bulk operations and a regular-operations queue for regular operations including application reads and writes, and wherein a quality of service (QOS) component manages selection and timing of queued operations to be performed by an execution component.

4. The method of claim 3, wherein responding to the second bulk operation request with the delayed acknowledgment is a delayed-response mechanism used at one level of a two-level response strategy of the QoS component, the two-level response strategy including (1) setting a number of bulk operation requests to be scheduled for execution at a given time, the number being generally inversely proportional to the loading level, and (2) selectively delaying acknowledgments to the bulk operation requests to slow down a pace of the hosts issuing the bulk operation requests.

5. The method of claim 4, wherein the selective delaying operation at level (2) is modified by, in response to queued bulk operation requests approaching timeout thresholds while waiting for scheduling in the bulk-operations queue, increasing priority of the queued bulk operation requests to promote earlier execution and avoid disruptive time-outs.

6. The method of claim 4, wherein the schedule-setting at level (1) is modified by, in response to detection that the data storage system is approaching an out of space condition, raising the priority of bulk operation requests so that they are executed even when the loading level exceeds the predetermined threshold, to promote freeing of storage resources and thereby avoid the out-of-space condition.

7. The method of claim 6, wherein, in addition to raising the priority on bulk operation requests, raising priority on other background processes that operate to free storage resources.

8. The method of claim 1, wherein each bulk operation is an UNMAP operation including a respective UNMAP request from a host computer to the data storage system, each UNMAP request identifying a respective area of storage to be deallocated and made available for a new allocation.

9. A data storage system comprising storage devices and electronic circuitry for providing persistent secondary storage to separate host computers, the electronic circuitry including storage processing circuitry configured and operative to execute storage system software to cause the data storage system to influence a rate of executing bulk operations for one or more separate host computers, each bulk operation including a respective bulk operation request from a host computer to the data storage system identifying a respective area of storage to be deallocated and made available for a new allocation, each host computer issuing new bulk operation requests only as preceding bulk operation requests are completed as indicated by corresponding acknowledgements from the data storage system, the method comprising steps, by the data storage system, of:

continually monitoring a loading level of processing requests from the host computers relative to a predetermined threshold;

in response to the loading level not exceeding the predetermined threshold, responding to a first bulk operation request with a normal acknowledgment, the normal acknowledgment being issued without a rate-managing delay and thus enabling a requesting host to issue a subsequent second bulk operation request at a nominal time after the first bulk operation request; and in response to the loading level exceeding the predetermined threshold, responding to a third bulk operation request with a delayed acknowledgment, the delayed acknowledgment being issued with the rate-managing delay and thus delaying issuance by requesting host of a subsequent fourth bulk operation request to a delayed time after the third bulk operation request.

10. The data storage system of claim 9, wherein the monitoring includes (1) tracking latencies of latency-sensitive requests separate from the bulk storage operations and calculating an average latency, and (2) comparing a current value of the average latency to a predetermined maximum desired latency for the latency-sensitive requests.

11. The data storage system of claim 9, wherein the data storage system maintains distinct queues including an bulk-operations queue for bulk operations and a regular-operations queue for regular operations including application reads and writes, and wherein a quality of service (QoS) component manages selection and timing of queued operations to be performed by an execution component.

12. The data storage system of claim 11, wherein responding to the second bulk operation request with the delayed acknowledgment is a delayed-response mechanism used at one level of a two-level response strategy of the QoS component, the two-level response strategy including (1) setting a number of bulk operation requests to be scheduled for execution at a given time, the number being generally inversely proportional to the loading level, and (2) selectively delaying acknowledgments to the bulk operation requests to slow down a pace of the hosts issuing the bulk operation requests.

13. The data storage system of claim 12, wherein the selective delaying operation at level (2) is modified by, in response to queued bulk operation requests approaching timeout thresholds while waiting for scheduling in the bulk-operations queue, increasing priority of the queued bulk operation requests to promote earlier execution and avoid disruptive time-outs.

14. The data storage system of claim 12, wherein the schedule-setting at level (1) is modified by, in response to detection that the data storage system is approaching an out of space condition, raising the priority of bulk operation requests so that they are executed even when the loading level exceeds the predetermined threshold, to promote freeing of storage resources and thereby avoid the out-of-space condition.

15. The data storage system of claim 14, wherein, in addition to raising the priority on bulk operation requests, raising priority on other background processes that operate to free storage resources.

16. The data storage system of claim 9, wherein each bulk operation is an UNMAP operation including a respective UNMAP request from a host computer to the data storage system, each UNMAP request identifying a respective area of storage to be deallocated and made available for a new allocation.

* * * * *